Figure 1:
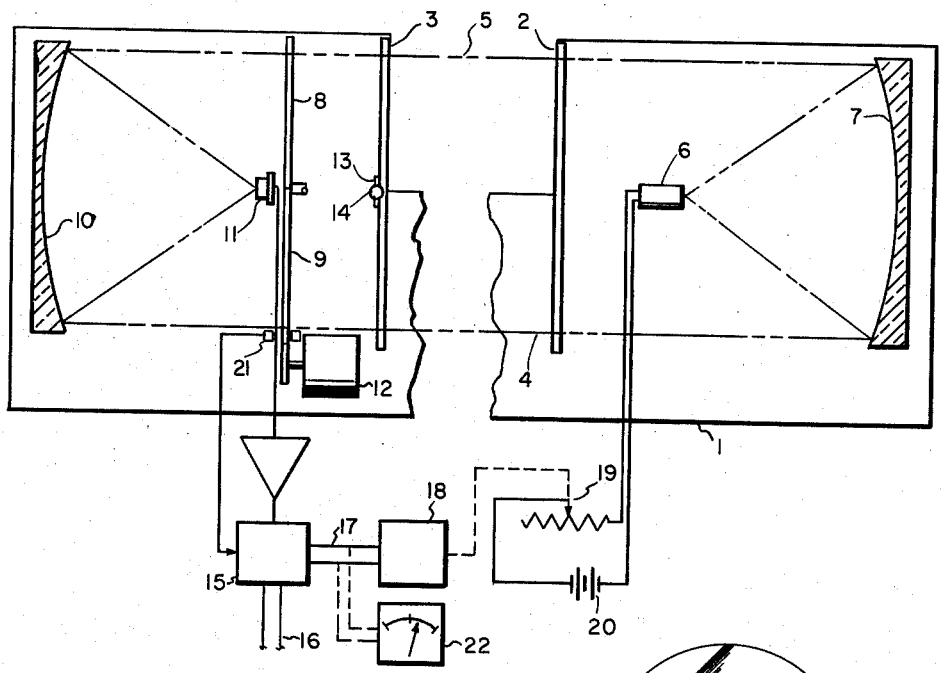

July 6, 1965

T. F. McHENRY 3,193,677

SELF-CALIBRATING TWO PATH INFRARED GAS
ANALYZER HAVING ONE ENCLOSED PATH

Filed May 21, 1963

INVENTOR.
THOMAS F. McHENRY

BY
*Robert Ames Norton*
ATTORNEY

United States Patent Office 3,193,677
Patented July 6, 1965

3,193,677
SELF-CALIBRATING TWO PATH INFRARED GAS ANALYZER HAVING ONE ENCLOSED PATH
Thomas F. McHenry, Norwalk, Conn., assignor to Barnes Engineering Company, Stamford, Conn., a corporation of Delaware
Filed May 21, 1963, Ser. No. 282,096
5 Claims. (Cl. 250—43.5)

This invention relates to an improved two path infrared fluid analyzer having one enclosed path.

In the past many instruments have been designed for gas analysis by infrared radiation at different wavelengths. When a wavelength is chosen in which the given constituent of the gas, or one the presence of which is to be detected, absorbs strongly, it is possible to analyze for its concentration or to actuate a warning when the constituent reaches a predetermined concentration. The instruments can be made to give good results when operated by highly skilled personnel in a constant environment and where weight and bulk are of little concern. However, the instruments are sensitive to change in radiation of the infrared source used, to changes of infrared detector sensitivity, and other factors.

In my copending application Serial No. 36,532 filed June 16, 1960, now Patent No. 3,091,690, May 28, 1963, the instrument essentially provided two paths, at least one of which is enclosed, and means for interposing two different filters in the paths sequentially. This was effected in my prior application either by rotating a wheel containing the two filters, or by stationary filters and a means for rotating the beam from the infrared source through the two paths. If the geometry of the paths was made equal, that is the same effective radiation cross-section, and if the transmission of the filters was also made equal for the paths when a given constituent was not present, the instrument had the extraordinary properties of being insensitive to any changes in infrared light source or detector sensitivity or filter transmission or changes in the effective paths as, for example, by dust on windows or by smoke or other nonselective absorbers coming into the path which is open to the atmosphere or in which the constituent is to be located. The only possibility of a spurious signal occurred when there was both a change in the transmission through the filters and a change in the geometry of the path. In other words, as long as the filters and the spectral characteristics of the infrared source remain constant, it made no difference if smoke or other nonselective absorbers were present in the paths, or if the paths were made equal it made no difference if the filter transmission light source intensity or detector response changed.

Great as is the advance as represented by earlier patent application referred to above, there still remained a problem when both the path cross-section and spectral characteristics changed. It was an easy matter to make the paths equal initially, and a considerably more difficult problem to make the filters exactly equal in their transmission when the constituent to be monitored was not present. Also, it was difficult to maintain filter transmission constant and infrared radiation characteristics constant. As long as the path remained the same, this created no problem, but if, after a change in the spectral transmission had occurred, there was then a change in the path length or effective cross-section, as by smoke getting into a path, dirt on one path window which cut down transmission more than on the other, a spurious signal could still be produced. It is with a solution of this residual problem that the present invention deals, and there is provided a system in which there is automatic and continuous recalibration so that the instrument is always in the position to be insensitive to any changes except the appearance of the agent to be detected.

The present invention requires certain optical configurations with certain electronic circuits. The electronic circuits are well known and become a part of the combination of the present invention only when they are associated with the optical elements to perform the improved result of which the present invention is capable.

Figure 2:
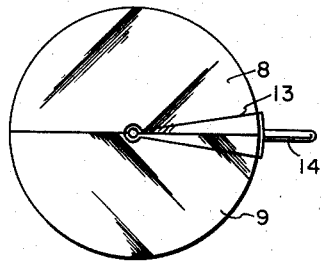

In effecting the improved results of the present invention, as will be described below in connection with the drawings, it will be noted that the improved result is obtained by deliberately sacrificing a desirable, but not necessary, feature: a uniform path cross-section. The invention will also be described with one of the two modifications of my prior patent in which the filters are turned and the beam held stationary although, as will be described, it is obviously applicable also to the other method where the filters remain stationary and the beam is turned. For practical convenience, however, the mechanical construction is somewhat cheaper with the former modification, and this will be the one which is specifically described in conjunction with the drawings, in which:

FIG. 1 is a vertical cross-section and block diagram of a system corresponding to FIG. 1 of my earlier copending application, FIG. 2 is an elevation of the filter wheel, and FIGS. 3A–D illustrate positions of the filter wheel at 90° intervals.

The instrument shown in FIG. 1 consists of a housing 1 forming enclosed and exposed paths 4 and 5, with windows at the ends of the paths shown at 2 and 3. A source of infrared radiation 6 is positioned so that the radiation is collimated by the mirror 7. The beams pass through both paths, then through a color wheel having filters 8 and 9 and are finally imaged on a detector 11 by mirror 10. The color wheel is rotated at a suitable speed by a motor 12. This portion of the drawing is substantially the same as FIG. 1 of my earlier patent, but in the present invention there is provided a movable sector 13 provided with a handle 14, the sector being capable of adjustment about the axis of the filters 8 and 9. This is best shown in FIG. 2.

Figure 3:
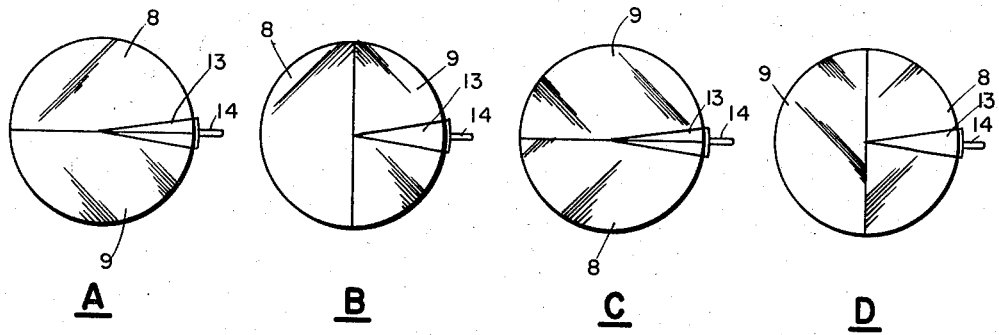

The output of the detector, which is A.C., is amplified and then is synchronously demodulated in two modes. One is as described in my Patent 3,091,690, where switching occurs when the filters are centered in the two paths. This mode will be called the "in-phase" mode, and is illustrated in FIGS. 3A and 3C. An additional switching action is added, however, in this invention. The amplifier output is also switched when the filters are at 90° to the two paths, as illustrated in FIGS. 3B and 3D. The amplifier must have a low output impedance, compared to the input impedance of the circuitry beyond the synchronously demodulating switch gates, to eliminate "crosstalk" or signal degradation. The switching may be accomplished electronically or electromechanically by means of a commutator or cam-operated switches. If done electronically, reference pulses are generated by a simple optical, magnetic, or other pulse generator 21 operated by the filter wheel.

The "in-phase" signals leave the synchronous demodulator circuit over the wires 16, while the quadrature signals are connected by the wires 17 to a servo system 18 which turns a control, such as a rheostat 19, in the supply circuit to the infrared radiator 6. This is shown diagrammatically as a D.C. circuit with a battery 20.

The operation by which the instrument is calibrated will now be described. With neither the exposed nor the enclosed path containing any of the constituent to be detected, which absorbs in the wavelength band covered by filter 8, the servo 18 is cut off and the motor 12 started. It is possible to actuate the control of the temperature of the source 6 manually. In such a case, the wires 17 are connected to a zero center meter 22. This is shown with dotted lines. The automatic actuation by means of the servo 18 is the preferred embodiment. However, the invention is really concerned primarily with the production of an error signal in quadrature, whether this error signal is used to actuate an indicator or whether, in the preferred embodiment, it changes the spectral characteristics of the source 6 by a servo mechanism. One of the filters is, temporarily, partially or wholly masked, which creates a very great filter unbalance. The sector 13, which extends across one side where the paths are adjusted, is then adjusted until there is a zero in-phase signal coming out of the output wires 16, and then locked in position. In other words, the paths are exactly balanced geometrically, as far as system noise permits. The masking of one of the filters makes the nulling more precise, as the in-phase signal, due to path imbalance, is greater when the filters are at maximum imbalance. The instrument is then stopped and the temporary mask removed from the obscured filter.

It should be noted that after nulling, the paths are exactly equal in effective cross-section. The filters initially may be perfectly balanced for the central setting of the rheostat 19, or they are more likely to be considerably unbalanced. The servo 18 is connected, and the machine is started up.

Now, consider the "quadrature" output. It was acknowledged in my Patent 3,091,690 that the filter could not be manufactured to achieve perfect balance, and therein it was suggested that the balance could be achieved by stippling or otherwise diminishing the transmittance of the filter with higher transmission to the source energy, whichever it was. This has proved extremely difficult and tedious, and adds to instrument cost. Also, changes in the source temperature or spectral emissivity would effectively introduce a filter imbalance. While this did not produce an error signal when the paths were geometrically balanced, it would and did produce a scale change when a gas or specific absorber was present.

Introducing the vane 13 and the "quadrature" detection channel results in a great benefit, since an artificial path imbalance at quadrature is introduced. If one filter transmits more radiation than the other when it is unobscured by the vane, more energy will reach the detector than when it is obscured by the vane. The "quadrature" channel will therefore have a strong output signal, proportional to this imbalance. Let us assume that the "quadrature" signal indicates that the filter transmitting the shorter wavelength radiation transmits less than the other, longer wavelength, filter. The filter can be effectively balanced by merely increasing the source temperature. In accordance with Plancks' Law, the relative energy at short wavelengths increases faster than that at long wavelengths when a body is heated. The method can be employed at any two wavelengths, but is much more effective when the short wavelength filter's transmission region is on the short wavelength side of the peak of the Planckian curve.

The signal from the quadrature channel is amplified and used to control the temperature of source 6. The important fact is that increasing the source temperature will always increase the apparent relative transmission of the shorter wavelength filter with respect to the longer wavelength filter. The converse is also true, of course.

If the filters are exactly balanced for the spectral characteristics of radiation from the radiator 6, there will be no quadrature signal in the wires 17, and so the servo will not operate. Normally the filters will be unbalanced at the particular setting of the rheostat, and so there will be a strong quadrature signal, caused by the presence of the vane 13. This actuates the servo 18 which adjusts the rheostat 19 until the spectral characteristics of the radiation from the radiator 6 produces an exact balance and the instrument can now continue to operate or is ready for use.

Let us now assume a spectral change either in the transmission of the filters, the spectral response of the detector, voltage of the battery 20 or anything else which will introduce an unbalance in the system which produces a quadrature signal. Now the servo 18 is actuated which varies the radiation from the radiator 6 until its spectral characteristics change in the right direction and in the right amount to restore color balance.

Since the automatic calibration operates continuously, it is important that it be unaffected by the presence in the exposed path of the constituent the absorption of which is to be determined. This automatically results from the fact that the signal due to varying amounts of the constituent to be detected is in the in-phase output of the synchronous demodulator 15 through the output wires 16 and is not present in quadrature. Thus, it will not actuate the servo system 18 which responds only to the quadrature signal.

In my prior patent there are shown various modifications of optics, both catoptric and catadioptric, and means for rotating the beam with stationary filters as well as rotary filters. Since the present invention does not change in any way the operation of the instrument, but only provides continuous and automatic calibration, only a simple all catoptric modification is illustrated in the drawings, but the invention, of course, is not limited thereto.

In the drawing there has been shown an instrument with one enclosed path and one exposed path. Where it is used to detect the presence or concentration of a constituent in the atmosphere this is the normal configuration. However, sometimes it is desirable to use the invention with a flow of gases, as in a chemical plant where a given concentration of one constituent is to be monitored. In such a case, of course, the exposed path will also be enclosed and will constitute a sample path through which a small portion of the gaseous atmosphere to be monitored is circulated.

While it is an important advantage of the present invention that an exact match of filter characteristics or initial path cross-section is not necessary and changes are compensated automatically, it is desirable to have the filters, initially at least, approximately of the same transmission in the absence of the gaseous constituent to be monitored. When the paths are also initially nearly equal, final precise nulling can be effected with a comparatively small sector 13 and so it obscures a relatively small portion of the two beam cross-sections. In this way, by utilizing the quadrature signal, it is possible with a small movable sector to effect compensation for all normal changes in filter transmission, detector response and spectral changes in the infrared source.

While the present invention makes differences in path geometry relatively unimportant, since the filters are perfectly balanced at all times, this should not be considered as an excuse for deliberate abuse of the instrument, and reasonable care should be taken to prevent gross changes in effective path cross-section. Thus, for example, the windows 2 and 3 should be kept reasonably clean even though they could be quite dirty, even quite unsymmetrically dirty, without seriously interfering with the usefulness of the instrument. Maximum sensitivity and reliability is obtained from a reasonably clean instrument, and it is advantageous to utilize the present invention with the normal care which a precision instrument deserves.

It is desirable that the paths be nearly in balance without the vane 13, so that it will seldom be necessary to move the vane more than a degree or two, and therefore the two signal channels will be almost exactly in quadrature. This is of importance when large concentrations of a constituent are to be measured, as otherwise a small error may be produced by cross-talk. The present invention thus preserves the unique features covered in my Patent 3,091,690, and adds a new and highly desirable feature of continuous, and preferably automatic, filter balancing.

In the specification and claims the term "A.C." is used in its ordinary broad sense to include periodically and repetitively changing current regardless of wave shape. The term is not used in the narrow sense of a current having a sine wave shape.

I claim:

1. In an infrared gas analyzer comprising in combination and in optical alignment, a source of infrared radiation, two paths, at least one of them being enclosed, said paths being of substantially equal effective cross-section and capable of containing different constituents, means for forming beams from said infrared source and for directing them through the paths, an infrared detector and two filtering means, one of which passes a band of infrared radiation containing a strong absorbing band of a predetermined chemical capable of existing in one path, means for imaging the two beams alternately through each filter onto the detector at a predetermined alternating frequency by relative rotation of paths and filters, and means connected to the output of said detector and responsive at the frequencies of said alternation of the beams and in phase therewith, the improvement which comprises, (a) a relatively opaque vane movable to bridge the axis of symmetry of the paths and on one side only of the center of rotation of the filters and paths, whereby an A.C. signal in quadrature to the output signal is produced when the filters become unbalanced to produce a signal in the absence of the predetermined chemical, and (b) means for adjusting the position of the vane until no signal is produced in phase with the output signal.

2. An analyzer according to claim 1 in which means are provided for altering the spectral characteristics of infrared radiation emitted from the infrared source, said means being actuated by the quadrature signal to change said spectral characteristics in a direction to reduce the quadrature signal to zero.

3. An analyzer according to claim 2 in which the infrared source is electrically heated and the means actuated by the quadrature signal are current varying means for said source heating.

4. An infrared analyzer according to claim 1 in which the beams are stationary and the filters are rotated.

5. An infrared analyzer according to claim 3 in which the beams are stationary and the filters are rotated.

References Cited by the Examiner
UNITED STATES PATENTS

| | | | |
|---|---|---|---|
| 2,502,319 | 3/50 | Golay | 250—43.5 |
| 2,718,597 | 9/55 | Heigl et al. | 250—43.5 |
| 2,806,144 | 9/57 | Berger et al. | 250—43.5 |
| 2,904,686 | 9/59 | Sebens | 250—43.5 |
| 2,926,253 | 2/60 | Munday | 250—43.5 |
| 2,986,633 | 5/61 | Martin | 250—43.5 |
| 3,084,253 | 4/63 | McHenry et al. | 250—86 |
| 3,091,690 | 5/63 | McHenry | 250—43.5 |

RALPH G. NILSON, *Primary Examiner.*

ARCHIE R. BORCHELT, *Examiner.*